(12) United States Patent
Park et al.

(10) Patent No.: US 10,087,095 B2
(45) Date of Patent: Oct. 2, 2018

(54) BALLAST WATER TREATMENT SYSTEM (71) Applicant: TECH CROSS CO., LTD., Seoul (KR)

(72) Inventors: Kyuwon Park, Busan (KR); Seongtae Kim, Asan-si (KR); Haidon Lee, Suwon-si (KR); Yongseok Park, Pyeongtaek-si (KR); Daewon Kim, Asan-si (KR); Kisung Lee, Pyeongtaek-si (KR); Jahun Ku, Namyangju-si (KR); Yujin Kim, Hwaseong-si (KR)

(73) Assignee: TECHCROSS CO., LTD., Seoul (KR)

( * ) Notice: Subject to any disclaimer, the term of this patent is extended or adjusted under 35 U.S.C. 154(b) by 468 days.

(21) Appl. No.: 14/779,153

(22) PCT Filed: Mar. 21, 2014

(86) PCT No.: PCT/KR2014/002415
§ 371 (c)(1),
(2) Date: Dec. 30, 2015

(87) PCT Pub. No.: WO2014/148867
PCT Pub. Date: Sep. 25, 2014

(65) Prior Publication Data
US 2016/0130165 A1     May 12, 2016

(30) Foreign Application Priority Data

Mar. 22, 2013    (KR) .................. 10-2013-0031147
Mar. 22, 2013    (KR) .................. 10-2013-0031157

(51) Int. Cl.
*B01D 29/39*       (2006.01)
*B01D 29/46*       (2006.01)
(Continued)

(52) U.S. Cl.
CPC ............... *C02F 9/00* (2013.01); *B63J 4/002* (2013.01); *C02F 1/004* (2013.01); *C02F 1/008* (2013.01);
(Continued)

(58) Field of Classification Search
CPC .. B01D 29/39; B01D 29/39546; B01D 29/44; B01D 29/46; B01D 29/50; B01D 29/52;
(Continued)

(56) References Cited

U.S. PATENT DOCUMENTS 5,227,053 A *   7/1993   Brym ..................... C02F 9/005
                                                                    210/143
7,883,622 B1 *   2/2011   Barnes ..................... C02F 1/78
                                                                    210/143
(Continued)

FOREIGN PATENT DOCUMENTS

JP        2012-217966 A    11/2012
KR      10-0691380 B1    3/2007
(Continued)

OTHER PUBLICATIONS

International Search Report of PCT/KR2014/002415 dated Jun. 10, 2014.

*Primary Examiner* — Joseph W Drodge
(74) *Attorney, Agent, or Firm* — Sughrue Mion, PLLC (57) ABSTRACT

The present invention relates to a ballast water treatment system. The ballast water treatment system comprises: a filter and electrolysis unit for receiving ballast water from the outside, and filtering and electrolyzing the ballast water; a first sensor unit for measuring seawater characteristics of the ballast water passing through the filter and electrolysis unit; a control unit for determining a contamination level of the ballast water according to the measured seawater char-
(Continued)

acteristic values so as to generate control signals for determining the strength of electrolysis and the input amount of chlorine dioxide; a chlorine dioxide generation unit for generating the chlorine dioxide; a UV/TiO$_2$ system which includes a TiO$_2$-coated plate, generates an OH radical through an interaction between ultraviolet rays and TiO$_2$ so as to enable the OH radical to sterilize residual microorganisms included in the ballast water passing through the filter and electrolysis unit; an automatic neutralization treatment device which includes a neutralizing agent, receives a neutralizing agent discharge signal from the control unit, and neutralizes the ballast water passing through the filter and the electrolysis unit; and a second sensor unit for measuring a TRO concentration of the ballast water neutralized in the automatic neutralization treatment device and transferring the measurement result to the control unit, wherein the control unit generates a control signal for controlling an amount of the neutralizing agent discharged from the automatic neutralization treatment device according to the measurement result received from the second sensor unit. Thus, the sterilization efficiency for the ballast water satisfies the USCG standards during the ballasting step for the ballast water.

7 Claims, 8 Drawing Sheets

(51) Int. Cl.

| | |
|---|---|
| *B01D 29/54* | (2006.01) |
| *C02F 1/32* | (2006.01) |
| *C02F 1/46* | (2006.01) |
| *C02F 1/66* | (2006.01) |
| *C02F 1/76* | (2006.01) |
| *C02F 9/00* | (2006.01) |
| *B63J 4/00* | (2006.01) |
| *C02F 1/00* | (2006.01) |
| *C02F 1/461* | (2006.01) |
| *C02F 1/72* | (2006.01) |
| *C02F 103/00* | (2006.01) |

(52) U.S. Cl.
CPC .......... *C02F 1/46104* (2013.01); *B01D 29/46* (2013.01); *C02F 1/32* (2013.01); *C02F 1/461* (2013.01); *C02F 1/66* (2013.01); *C02F 1/725* (2013.01); *C02F 1/76* (2013.01); *C02F 2103/008* (2013.01); *C02F 2209/001* (2013.01); *C02F 2209/003* (2013.01); *C02F 2209/005* (2013.01); *C02F 2209/02* (2013.01); *C02F 2209/05* (2013.01); *C02F 2209/06* (2013.01); *C02F 2209/22* (2013.01); *C02F 2209/29* (2013.01); *C02F 2303/04* (2013.01); *C02F 2303/185* (2013.01); *C02F 2305/023* (2013.01); *C02F 2305/10* (2013.01); *Y02A 20/156* (2018.01)

(58) Field of Classification Search
CPC ........ B01D 29/54; B01D 29/56; B01D 29/58; B63J 4/00; B63J 4/002; C02F 9/00; C02F 1/004; C02F 1/008; C02F 1/32; C02F 1/461; C02F 1/46104; C02F 1/66; C02F 1/725; C02F 1/76; C02F 2201/32; C02F 2201/322; C02F 2201/3228; C02F 2209/001; C02F 2209/003; C02F 2209/005; C02F 2209/02; C02F 2209/06; C02F 2209/22; C02F 2209/29; C02F 2303/18; C02F 2303/185; C02F 2303/04; C02F 2103/008; C02F 2305/023; C02F 2305/10; C02F 2001/46152; C02F 2001/46171; C02F 2201/46; C02F 2201/46105; C02F 2201/461
USPC ............... 114/125; 210/739, 748.12, 748.16, 210/748.17, 748.2, 754, 758, 764, 806, 210/85, 96.1, 192, 200–203, 205, 206, 210/242.1, 259, 330, 331, 346, 347
See application file for complete search history.

(56) References Cited

U.S. PATENT DOCUMENTS

| | | | | |
|---|---|---|---|---|
| 2003/0070919 A1* | 4/2003 | Gilmore | ................... | B01J 19/08 |
| | | | | 204/275.1 |
| 2003/0209501 A1* | 11/2003 | Leung | ..................... | C02F 1/725 |
| | | | | 422/186.3 |
| 2005/0218084 A1* | 10/2005 | Leung | ..................... | C02F 1/325 |
| | | | | 201/748.14 |
| 2009/0127207 A1* | 5/2009 | Okamoto | ................ | B63B 13/00 |
| | | | | 210/747.6 |
| 2010/0116647 A1* | 5/2010 | Kornmuller | ............. | B63J 4/004 |
| | | | | 204/228.1 |
| 2011/0024361 A1* | 2/2011 | Schwartzel | ............. | C02F 1/325 |
| | | | | 210/739 |
| 2011/0139729 A1* | 6/2011 | Nupnau | ............... | G01N 17/008 |
| | | | | 210/749 |
| 2011/0180423 A1* | 7/2011 | Barry | ..................... | A01K 63/04 |
| | | | | 205/742 |
| 2014/0224714 A1* | 8/2014 | Palmer | ..................... | G06N 5/04 |
| | | | | 210/96.1 |
| 2015/0360155 A1* | 12/2015 | Peterson | .............. | B01D 37/025 |
| | | | | 210/195.1 |
| 2016/0326023 A1* | 11/2016 | Park | ....................... | C02F 1/4674 |

FOREIGN PATENT DOCUMENTS

| | | |
|---|---|---|
| KR | 10-0776205 B1 | 11/2007 |
| KR | 10-2009-0082196 A | 7/2009 |
| KR | 10-2010-0059089 A | 6/2010 |

* cited by examiner

BALLAST WATER TREATMENT SYSTEM

TECHNICAL FIELD OF THE INVENTION

The present invention relates to a ballast water treatment system.

BACKGROUND OF THE INVENTION

A ship under operation receives ballast water from the outside to keep the ship balanced. In this way, the ballast water introduced into the ship is sterilized and stored in the ship, and when discharging outside, the ballast water is discharged to the outside after being neutralized by introducing a neutralizing agent to the ballast water.

The ballast water introduced into the ship is filtered by using one of mechanical, physical, or chemical method to remove solids and microorganisms contained in the ballast water. In this case, as for the mechanical method, a filtering method can be used for the ballast water which should be sterilized of microorganisms.

As for the filter for the ballast water, the filter can be an edged wire, a wire mesh, or a disk typed filter.

And, as for the physical method, an UV (ultraviolet rays) irradiating method and an AOP (advanced oxidation process) method for generating OH radicals can be used for the ballast water which should be sterilized of microorganisms.

Besides, as for the chemical method, using the chlorine-based fungicides or electrolysis, a hypochlorite (HClO) and hypochlorite ion (OCl—) producing method can be used to treat the ballast water which should be sterilized of microorganisms.

As for another example of the chemical method, it is possible to use a method of adding chemicals such as $O_3$, $ClO_3$.

However, among the sterilization methods of ballast water using the methods described above, the mechanical method has disadvantages in that it is difficult to wash out the scum attached to a filter, whereby, in case of using a screen filter such as edged wire or a mesh typed wire filter, clogging can be occurred due to solid.

And, the physical method has disadvantages in possibility of regrowth of microorganisms due to the absence of remaining sterilizing microorganisms. Also, the chemical method has disadvantages in that an additional process is needed to neutralize residual chemicals in the ballast water. These methods have a drawback that there is a limit for sterilizing microorganisms.

SUMMARY OF THE INVENTION

Technical Problem

Accordingly, the present invention is conceived to solve the foregoing problems, and an aspect of the present invention provides to improve the efficiency of sterilizing microorganisms.

Another technical problem which the present invention attempts to solve is to provide a ballast water treatment system which satisfies the criteria for sterilizing microorganisms of USCG (United States Coast Guard) standard.

Technical Solution

In accordance with an embodiment of the present invention, there is provided a ballast water treatment including: a filter and electrolysis unit for receiving ballast water from the outside, and filtering and electrolyzing the ballast water; a first sensor unit for measuring seawater characteristics of the ballast water passing through the filter and electrolysis unit and outputting the result of seawater characteristics; a control unit for determining a contamination level of the ballast water according to the measured seawater characteristic values so as to generate control signals for determining the strength of electrolysis and the input amount of chlorine dioxide; a chlorine dioxide generation unit for generating the chlorine dioxide, receiving the control signal from the control unit, and discharging the chlorine dioxide or not according to the control signal; a UV/$TiO_2$ system which includes a $TiO_2$-coated plate, generates an OH radical through an interaction between ultraviolet rays and $TiO_2$ so as to enable the OH radical to sterilize residual microorganisms included in the ballast water passing through the filter and electrolysis unit; an automatic neutralization treatment device which includes a neutralizing agent, receives a neutralizing agent discharge signal from the control unit, and neutralizes the ballast water passing through the filter and electrolysis unit; and a second sensor unit for measuring a TRO (total residual oxidant) concentration of the ballast water neutralized in the automatic neutralization treatment device and transferring the measurement result to the control unit, wherein the control unit generates a control signal for controlling the amount of the neutralizing agent discharged from the automatic neutralization treatment device according to the measurement result received from the second sensor unit.

The filter of the filter and electrolysis unit may be a disk filter.

The filter and electrolysis unit may be provided by multiply laminated electrode modules with a circular shape of a plate.

Seawater characteristics measured by the sensor unit may be one among the conductivity, temperature, TRO concentration of the ballast water.

In accordance with an embodiment of the present invention, a ballast water treatment system may include the chlorine dioxide precursor storage tank which stores a chlorine dioxide precursor and transfers that precursor to a chlorine dioxide generation unit.

The chlorine dioxide precursor may be $NaClO_2$, HCl, and NaOCl.

A $TiO_2$-coated plate of a UV/$TiO_2$ system may be formed in one of types of mesh structure or punched plate.

Effects of the Invention

In accordance of the present invention, the filter and electrolysis unit removes or sterilizes microorganisms and solids included in the ballast water. And during the ballasting step, according to the results of conductivity, temperature, TRO concentration of the ballast water, a chlorine dioxide is discharged into the ballast water to sterilize microorganisms in the ballast water.

And, during a deballasting step, a UV/$TiO_2$ system sterilizes residual microorganisms in the ballast water additionally, and neutralizes the ballast water by an automatic neutralization treatment device.

Thus, the sterilization efficiency for the ballast water satisfies the USCG standards during the ballasting step for the ballast water.

Moreover, due to sterilizing residual microorganisms in the ballast water additionally during the deballasting step, the treated ballast water satisfies the criteria for sterilizing microorganisms of USCG (United States Coast Guard) standard much more.

DETAILED DESCRIPTION OF THE EMBODIMENTS

In the following, with reference to accompanying drawings, the present invention will be described in detail for a person having knowledge of the normal in the art which this invention pertains to be carried out easily. However, the present invention may be embodied in several different ways, but is not limited to the embodiments set forth herein. And, the part not related to the explanation in the drawings is omitted to clearly describe the present invention. The similar parts throughout this document are denoted by the similar drawing numbers.

Hereinafter, exemplary embodiments of a ballast water treatment system according to the present invention will be described with reference to accompanying drawings.

Firstly, an embodiment of a ballast water treatment system according to the present invention will be described in detail with reference to FIG. 1.

Figure 1:
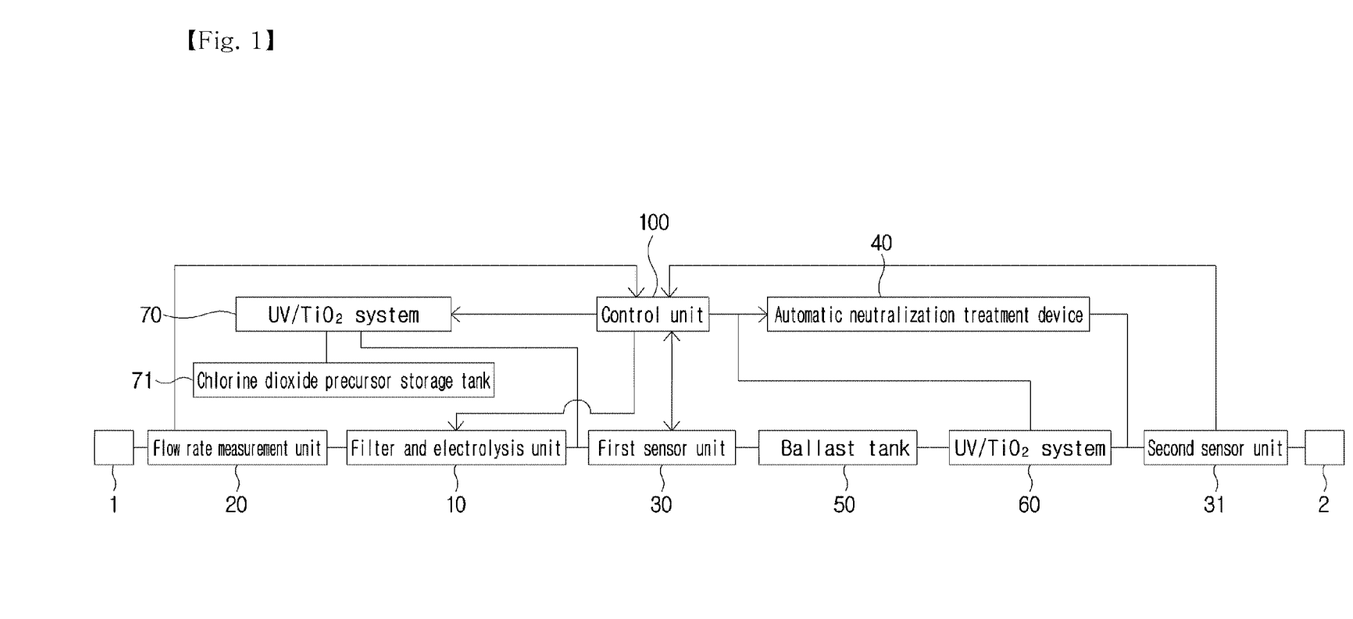
FIG. 1 is a block diagram of a ballast water treatment system according to an embodiment of the present invention.

As shown in FIG. 1, an embodiment of a ballast water treatment system according to the present invention includes: an inlet (1) for receiving ballast water from the outside; a flow rate measurement unit (20) for measuring the flow rate of ballast water flowed into the inlet (1); a filter and electrolysis unit (10) for filtering and electrolyzing the ballast water; a first sensor unit (30) for measuring seawater characteristics of the ballast water passing through the filter and electrolysis unit (10); a chlorine dioxide generation unit (70) for generating the chlorine dioxide to discharge into the ballast water; a control unit (100) for receiving measured seawater characteristic values from the first sensor unit (30) and monitoring the measured values and controlling the filter and electrolysis unit (10), a chlorine dioxide generation unit (70), an automatic neutralization treatment device (40); a ballast tank (50) for storing ballast water passing through the first sensor unit (30); a UV/$TiO_2$ system (60) for irradiating ultraviolet rays and reacting $TiO_2$ into the ballast water stored in the ballast tank (50) and discharged to the outside; the automatic neutralization treatment device (40) for injecting neutralizing agent into the ballast water stored in the ballast tank (50) and discharged to the outside; and a second sensor unit (31) for measuring a TRO concentration of the ballast water neutralized in the automatic neutralization treatment device (40); an outlet (2) for discharging ballast water to outside.

In accordance with an embodiment of the present invention, a ballast water treatment system receives seawater (hereinafter referred to as "ballast water") from the outside of the ship. In this case, through the inlet (sea chest) (1) and a pipe line, ballast water from the outside is introduced into the ballast water treatment system.

And, the flow rate measurement unit (20) measures the flow rate of ballast water introduced through the inlet (2), and transfers the measured values to the control unit (100).

The filter and electrolysis unit (10) sterilizes microorganisms in the ballast water introduced from the outside by mechanical and chemical methods.

With reference to FIG. 2a, FIG. 2b, and FIG. 3a~FIG. 3d, in accordance with an embodiment of the present invention, the filter and electrolysis unit (10) will be described in more detail. The filter and electrolysis unit (10) comprises an inlet and an outlet for introducing and discharging ballast water (hereinafter referred to as "inlet/outlet") (11), an electrolysis unit (12) including plural electrodes (121) for the electrolysis of the introduced ballast water, and a cover (13) for protecting the electrolysis unit (12)

Figure 2A:
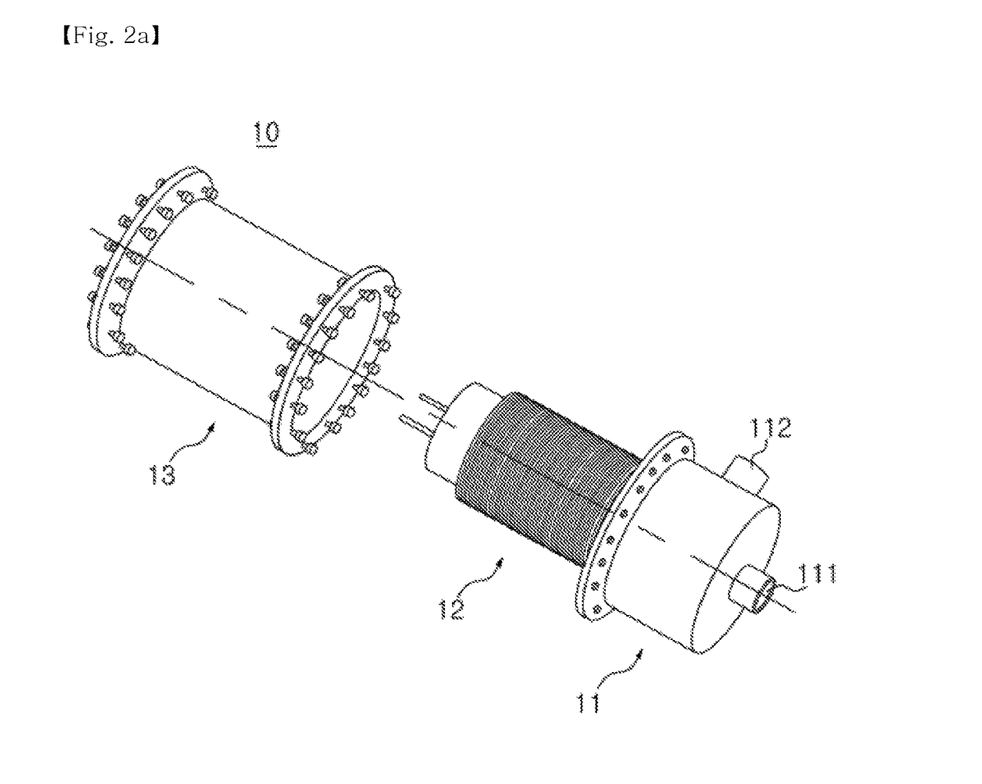
FIG. 2a is an exploded perspective view of a filter and electrolysis unit for a ballast water treatment system according to an embodiment of the present invention.

With reference to FIG. 2a, the inlet/outlet (11) of the filter and electrolysis unit (10) comprises an inlet (112) for introducing ballast water from the outside and an outlet (111) for discharging ballast water filtered and electrolyzed in the filter and electrolysis unit (10) to the outside.

And, the cover (13) has a structure fixed and connected to one end of the inlet/outlet (11). In this case, in case of the cover (13) of the electrolysis unit having fixed connection with the inlet/outlet (11), a filter element is positioned inside of the cover (13), and the electrolysis unit (12) is located inside of the filter element.

Figure 2B:
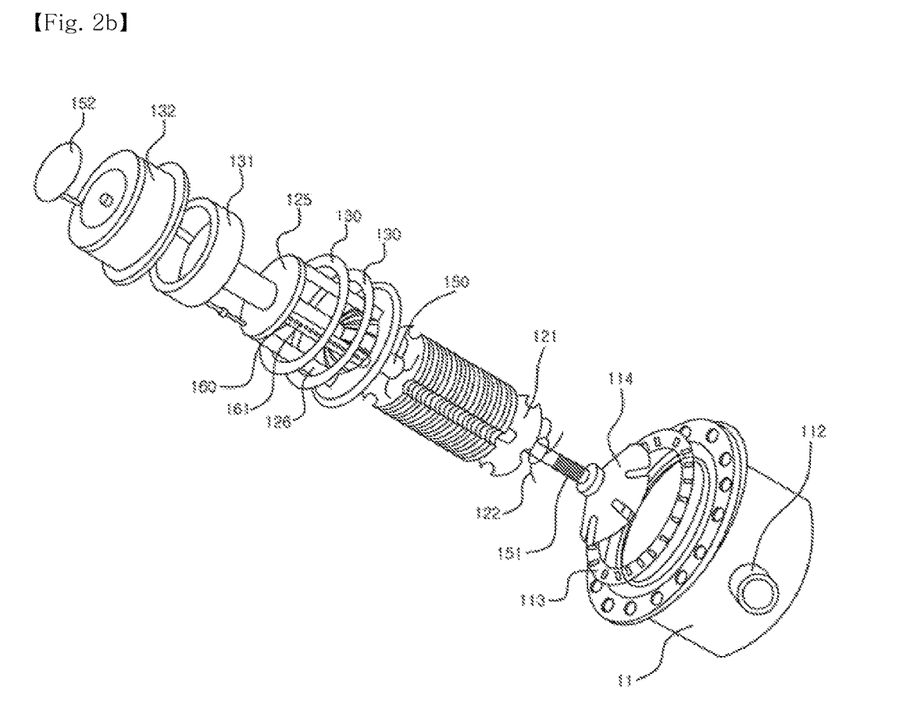
FIG. 2b is an exploded perspective view of a filter and electrolysis unit for a ballast water treatment system according to an embodiment of the present invention.

With reference to FIG. 2b, elements located in the cover (13) of the filter and electrolysis unit (10) will be described in detail. The filter and electrolysis unit (10) comprises a fixing plate (152), a filter pressing cover (132), a filter housing (131) located inside of the filter pressing cover (132), plural electrode modules (121), an electrode module housing (125) located for covering the outside of the plural electrode modules (121), filter elements (130) located outside of the electrode module housing (125), a spacer (122) located among plural electrode modules (121), a filter compressing spring (151) rolled in a support base (150), a flow path inducing unit (114) located in the support base (150), and a rotating derivative (113) located inside of the inlet/outlet (11).

Firstly, the electrolysis unit (12) including plural electrode modules (121) will be described in detail with reference to FIG. 3a~FIG. 3d.

Figure 3A:
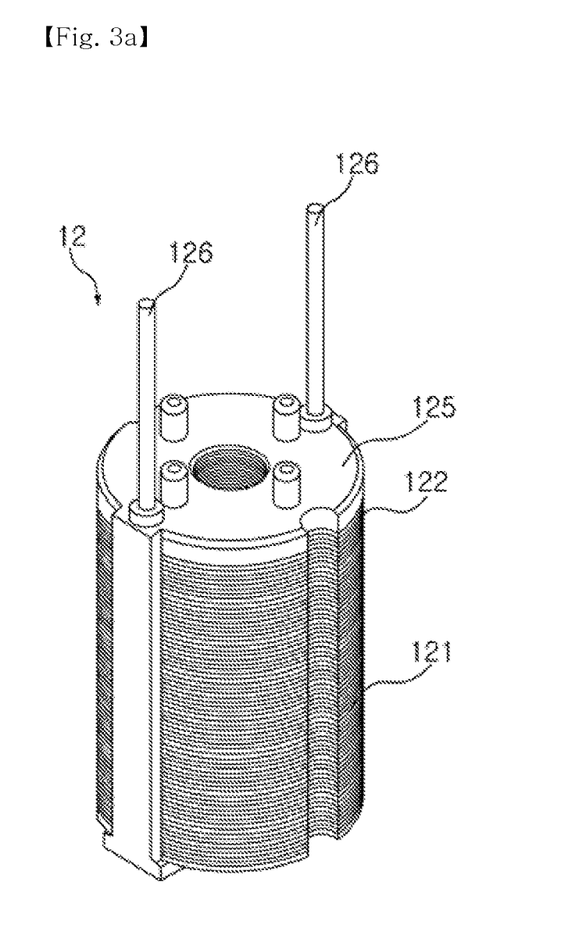
FIG. 3a is a perspective view of a part of a filter and electrolysis unit for a ballast water treatment system according to an embodiment of the present invention.
Figure 3B:
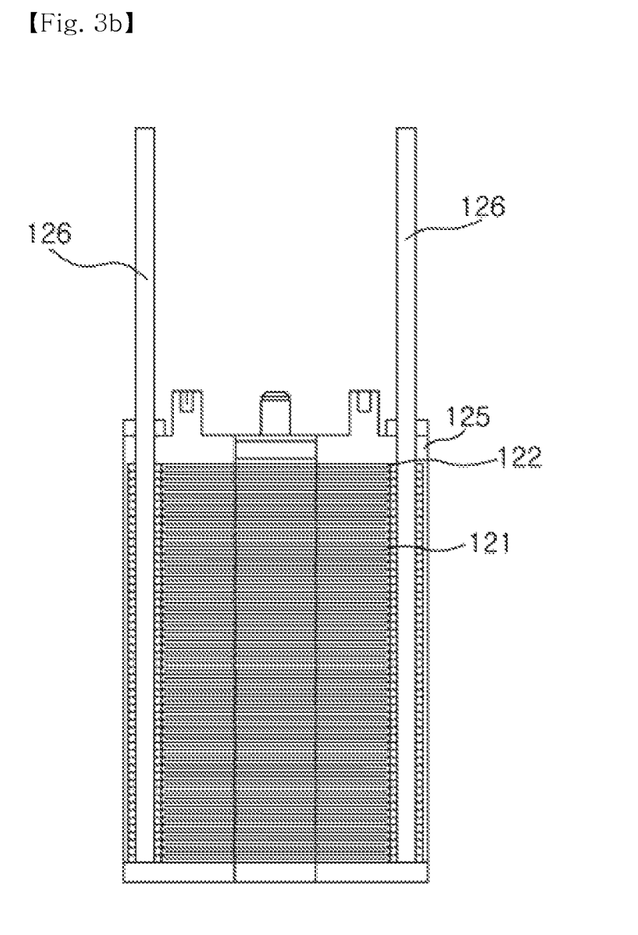
FIG. 3b is a cross-sectional view of a part of a filter and electrolysis unit for a ballast water treatment system according to an embodiment of the present invention.

With reference to FIG. 3a and FIG. 3b, the electrode module housing (125) is located for covering the outside of the plural electrode modules (121), in this case, one end of the electrode module housing (125) comprise electrode bus bars (126).

In addition, the electrode module housing (125) plays the role of support for supporting the filter elements (130).

And, the electrode module housing (125) comprises a backwash pipe (160) for back flushing the filter elements (130). The backwash pipe (160) is formed to have plural backwash discharge holes (161).

Two electrode bus bars (126) are located in the electrode module housing (125), being connected to an external rectifier (not shown) and being supplied with an electric current. These electrode bus bars (126) transfer the current delivered from the rectifier (not shown) to each of the electrode modules (121).

As shown in FIG. 3a and FIG. 3b, the two electrode bus bars (126) are provided, one electrode bus bar (126) is provided with the positive current, and the other electrode bus bar (126) is provided with the negative current.

And, the plural electrode modules (121) located inside the electrode module housing (125) are accumulated along the length direction of the support base (150), in this case, an electrode gap spacer (122) may be located among the plural electrode modules (121).

In this way, the plural electrode modules (121) located inside of the electrode module housing (125) and provided with the current from the electrode bus bar (126) electrolyze the ballast water introducing into the inlet/outlet (11) and passing through the electrolysis unit (12).

Figure 3C:
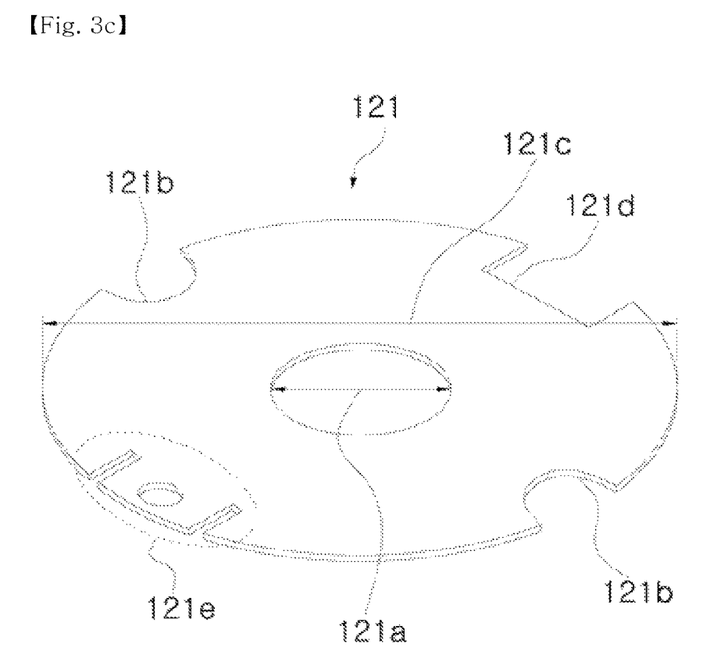
FIG. 3c is a perspective view of an electrode which is a part of a filter and electrolysis unit for a ballast water treatment system according to an embodiment of the present invention.

These electrode modules (121) will be described in more detail with reference to FIG. 3c. An electrode (121) is formed as a disk shape with the third diameter (121c), and formed as punched with the second diameter (121a) in the middle of the disk.

And, the electrode module (121) is provided with two of the first grooves (121b) which are punched with the semicircular shape along the circumference of the disk. Two of the first grooves (121b) are paths for the backwash pipe (160) of the electrode module housing (125). Thus, when the plural electrode modules (121) are accumulated and positioned inside of the electrode module housing (125), a backwash pipe (160) is located in the first groove (121b) of the electrodes module (121) so that the electrodes module (121) is connected inside of the electrode module housing (125).

In addition, the electrodes module (121) also comprises the second groove (121d) which is square-shaped, and the third groove (121e) located so as to face the second groove (121d).

The third groove (121e) includes a punched part formed thin square-shaped in a direction perpendicular to the perimeter of the disk. The third groove (121e) also includes the circular-shaped punched part between the two square-shaped punched parts, and, in this case, the circular-shaped punched part should be located so as not to contact the circumference of the electrodes module (121).

When the electrode modules (121) having the second groove (121d) and the third groove (121e) are connected to the inside of the electrode module housing (125), the electrode bus bar (126) is located passing through the second groove (121d) and the third groove (121e). Accordingly, the electrode modules (121) are provided with an electric current from the bus bars (126) of the electrodes.

Then, with reference to FIG. 3d, an electrode gap spacer (122) will be described in detail. The electrode gap spacer (122) may be located between an electrode module (121) and an electrode module (121) or among electrode modules (121) adjacent to the top (or bottom) surface of the electrode module housing (125).

In this way, the electrodes gap spacer (122) located between electrodes modules (121), as a spacer for inducing rotation of the water, comprises a circular ring having the first diameter (122a), and wings (122b) connected and formed along the periphery of the ring at regular intervals.

Figure 3D:
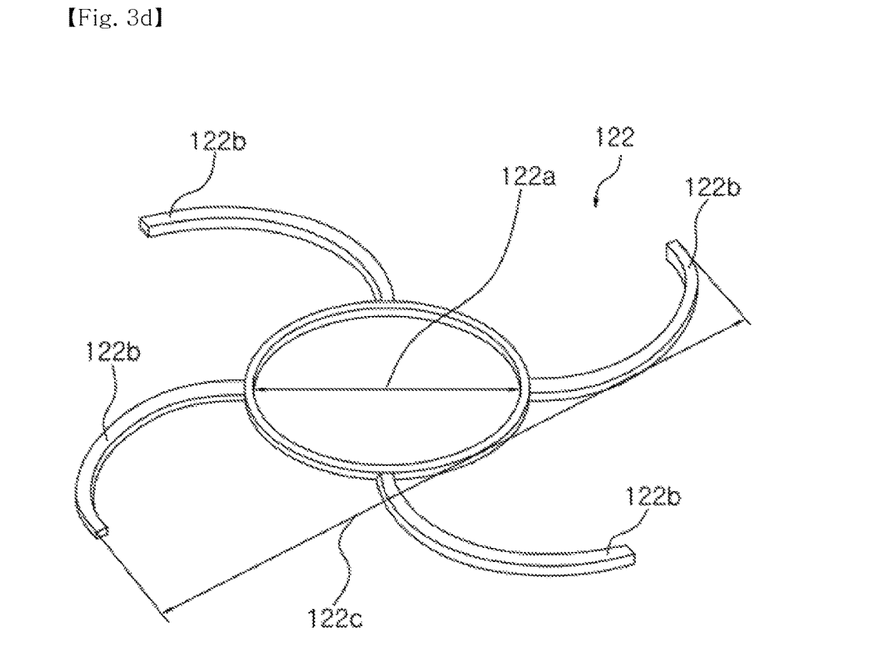
FIG. 3d is a perspective view of an electrode spacer which is a part of a filter and electrolysis unit for a ballast water treatment system according to an embodiment of the present invention.

In this case, the distance (122c) between one wing (122b) and other one located on the opposite side of the wing (122b), i.e., the length (122c) of the electrode gap spacer (122) has a shorter length than the length (the third diameter) (121c) of the electrode (121) shown in FIG. 3d.

And, the first diameter (122a) of the electrode gap spacer (122) is formed longer than the second diameter (121a), which is formed on the electrode (121) shown in FIG. 3d.

Thus, by the electrode gap spacer (122) being provided with the wings (122b), the electrode gap spacer (122) is rotated by ballast water which is filtered by the filter element (130) and moves to the electrolysis unit (12). As a result, the electrolysis process efficiency from an electrode module (121) is higher because the ballast water adjacent to the electrode module (121) is further rotated, and accordingly, the TRO (total residual oxidant) generation efficiency of the ballast water is increased.

Moreover, by being provided with the electrode gap spacer (122), the ballast water electrolyzed in the electrode module (121) is rotating, so that there is an effect that scales (impurities such as metal oxides) which may be accumulated in the filter element (130) can be removed.

This electrode gap spacer (122) may be made of an insulating material such as plastic.

With reference to FIG. 2b, the filter and electrolysis unit (10) will be described again. Filter elements (130) are located outside of an electrode module housing (125).

The filter elements (130) may be a disk filter having the form of a disk. If the disk-shaped filter elements (130) are provided, plural filter elements (130) can be accumulated and located on the outside of the electrode module housing (125).

If the plural filter elements (130) are accumulated and located, the filter elements (130) are fixed in a constant pressure by the pressing spring (151), in this case, the disk-shaped filter elements (130) may be formed to have a groove in the range of 50 μm to 100 μm.

These filter elements (130) primarily filter the ballast water introduced through the inlet/outlet (11), filtering the solids or microorganisms in the range of 50 μm to 100 μm contained in the ballast water.

Accordingly, the filter elements (130) composed of a disk filter, have an effect that clogging of dusts in the filter wires does not occur permanently by processing back flushing using the backwash pipe (160).

And, the rotating derivative (113) located inside the inlet/outlet (11) is formed to be a ring-shaped and rotates in one direction.

As shown in FIG. 2b, the rotating derivative (113) is provided with a part protruding at regular intervals on one surface. In this case, due to the protruding part formed on the rotating derivative (113), when the rotating derivative (113) is rotated in one direction, the ballast water adjacent to the rotating derivative (113) is rotated in one direction.

At this time, due to the rotation of the rotating derivative (113), solids and microorganisms contained in ballast water rotate in one direction so as to be uniformly distributed in the ballast water, which makes an effect of improved filtering efficiency of the ballast water in the filter element (130).

This rotating derivative (113) can be rotated by receiving a power from an external motor (not shown).

And, the ballast water located around the rotating derivative (113) and rotated in one direction according the rotation of the rotating derivative (113) may be the ballast water which is introduced from the outside through the inlet (112).

The flow path inducing unit (114) is located adjacent to the rotating derivative (113) and a rubber which is formed of a rubber material. In more detail, the flow path inducing unit (114) has a shape like a sucker. In this case, the convex part of the flow path inducing unit (114) faces toward the opposite direction of the inlet/outlet (11), and the concave part of the flow path inducing unit (114) faces toward the direction of the inlet/outlet (11).

Having a convex shape in one direction of the flow path inducing unit (114) in this way, the ballast water which is filtered and electrolyzed completely and flows from the filter element (130) toward the inlet/outlet (11) direction can flow easily to the inlet/outlet (11) after passing through the flow path inducing unit (114).

In addition, the flow path inducing unit (114) is formed with a plurality of grooves (slit) and through the grooves of the flow path inducing unit (114), the ballast water filtered and electrolyzed completely flows to the outlet (111) of inlet/outlet (11).

The flow path inducing unit (114) can be located to the direction of the electrode module (121) or to the opposite direction.

As an example, when water flowing inside of the filter and electrolysis unit (10) flows from the filter element (130) toward the direction of the inlet/outlet (11), the flow path inducing unit (114) is located so as to face the opposite direction of the electrode module (121) as shown in FIG. 2b.

In this way, when the flow path inducing unit (114) is located to face the opposite direction of the electrode module (121), the flow path inducing unit (114), as shown in FIG. 2b, is shrank, and water flow through the empty space formed in the flow path inducing unit (114) toward the inlet/outlet (11).

On the other hand, as another example, if water which flows inside the filter and electrolysis unit (10) flows from the inlet/outlet (11) toward the direction of the filter element (130) to clean the filter element (130), empty spaces formed in the flow path inducing unit (114) stick to one another and the flow path inducing unit (114) is in an expanded state. Accordingly, the flow path of the water in the filter and electrolysis unit (10) toward the inlet/outlet (11) is closed. Therefore, water can flow only through the backwash pipe.

In this way, when the flow path inducing unit (114) is in the expanded position, the filter pressing spring (151) located adjacent to the flow path inducing unit (114) is pressed, the backwash water is drawn into the backwash pipe (160) because of the pressure differential derived from the operation of pressing spring (151).

In this case, backwash water drawn into the backwash pipe (160) is discharged from the electrode module housing (125) to the filter element (130) along the backwash discharge hole (161). Accordingly, foreign materials such as dust accumulated in the filter element (130) are to be washed.

Then, backwash water discharged from the backwash pipe (160) and washing the filter element (130) flows toward the flow path inducing unit (114). And, backwash water flows along a groove formed in the flow path inducing unit (114) and is discharged to the outside of the filter and an electrolysis unit (10) via the outlet (111).

Having the structure in the filter and electrolysis unit (10) as described above, ballast water introduced from the outside is primarily filtered by the filter element (130) and electrolyzed from the plural electrode modules (121). Accordingly, there is an effect that the filter and electrolysis unit (10) can more effectively remove solids or microorganisms contained in the ship ballast water comparing to using only one of a filter or an electrolysis module.

In addition, because the filter and electrolysis unit (10) performs filtering and electrolysis together, the ballast water discharged from the filter and electrolysis unit (10) can satisfy standard for sterilization of ballast water based on the standard of the USCG (United States Coast Guard).

With reference to FIG. 1 again, the ballast water treatment system according to an embodiment of the present invention will be explained. The first sensor unit (30) is connected with the filter and electrolysis unit (10), receives the treated ballast water after the process of the filtering and electrolysis, and measures conductivity, temperature, and TRO (total residual oxidant) concentration of the received ballast water.

In this case, the first sensor unit (30) can receive only a part of the ballast water discharged from the filter and electrolysis unit (10) through bypass.

This first sensor unit (30) is positioned connected to the control unit (100), transferring the conductivity, the temperature and the TRO concentration of the ballast water measured in the first sensor unit (30) to the control unit (100).

A chlorine dioxide precursor storage tank (71), as a storage tank for a chlorine dioxide precursor to generate chlorine dioxide ($ClO_2$), is connected to the chlorine dioxide generation unit (70) through a pipe.

The chlorine dioxide precursor stored in the chlorine dioxide precursor storage tank (71) may be one or more among $NaClO_2$, HCl, NaOCl.

And, as previously described, the chlorine dioxide generation unit (70), through a pipe, is connected with the chlorine dioxide precursor storage tank (71), and is connected to the control unit (100).

In this case, the pipe connecting the chlorine dioxide generation unit (70) and the chlorine dioxide precursor storage tank (71) can be formed including a pump. Due to the vacuum generated by operation of the pump, the chlorine dioxide precursor stored in the chlorine dioxide precursor storage tank (71) is transferred to the chlorine dioxide generation unit (70).

This chlorine dioxide generation unit (70) produces chlorine dioxide by mixing the chlorine dioxide precursor and transfers chlorine dioxide, which is produced according to a control signal transmitted from the control unit (100), to the ballast piping.

Ballast piping may be a pipe connecting the filter and electrolysis unit (10) with the ballast tank (50), or a pipe connecting the filter and electrolysis unit (10) with the first sensor unit (30).

In this case, the concentration of the chlorine dioxide produced from the chlorine dioxide generation unit (70) is from 1,000 to 10,000 mg/L. The chlorine dioxide generation unit (70) can introduce chlorine dioxide produced into the ballast piping after diluting.

The chlorine dioxide generation unit (70) is capable of generating chlorine dioxide by using the following chemical formula 1.

[Chemical Formula 1]

$$2NaClO_2 + NaOCl + 2HCl \rightarrow ClO_2 + 3NaCl + H_2O \quad (1)$$

$$5Na_2S_2O_3 + 8ClO_2 + 9H_2O \rightarrow 10NaHSO_4 + 8HCl \quad (2)$$

$$Na_2S_2O_3 + 2NaClO_2 + H2O \rightarrow 2NaHSO_4 + 2NaCl \quad (3)$$

In the above Chemical formula 1, the formula (1) is for the production of $ClO_2$ by diluting and mixing with $NaClO_2$, NaOCl, HCl according to the reaction mole number.

In addition, in the above Chemical formula 1, the formula (2) and (3) is for the neutralization reaction for residual $ClO_2$ and $ClO_2^-$ on the condition of deballasting.

As already explained, the chlorine dioxide generation unit (70), according to the control signal of the control unit (100), introduces chlorine dioxide into the ballasting piping. At this time, the control signal generated from the control unit (100) may be a signal to introduce or not to introduce the chlorine dioxide, and also to adjust the input amount of the chlorine dioxide.

The control unit (100) for generating these control signals will be described later in more detail.

Continuously, with reference to FIG. 1, the ballast tank (50) is located with the connection of the first sensor unit (30). In this case, when the first sensor unit (30) is configured to be bypassed from the filter and electrolysis unit (10), the ballast tank (50) is located with the connection of the filter and electrolysis unit (10).

This ballast tank (50), after filtering and sterilizing microorganisms from the electrolysis, and ballasting process of neutralization of oxidants generated from the electrolysis, receives the treated ship ballast water and stores the ballast water in the tank.

And then, the outlet (2) is a structure for discharging the ballast water stored in the ballast tank (50) to the outside of the ship. In order to discharge the ballast water stored in the ballast tank (50) to the outside of the ship, the process to neutralize the ballast water is necessary.

Accordingly, the automatic neutralization treatment device (40) includes a neutralizing agent for neutralizing the ballast water stored in the ballast tank (50), and introduces a neutralizing agent in the automatic neutralization treatment device (40) into a deballasting piping according to the a neutralizing agent input control signal transmitted from the control unit (100).

In this way, $ClO_2$ or $Br_2$ resided in the ballast water that is stored in the ballast tank (50) is neutralized.

In this case, the deballasting piping may be a pipe either connecting the ballast tank (50) and the outlet (2) or connecting the ballast tank (50) and the second sensor unit (31).

And, the UV/$TiO_2$ system (60) is located with the connection of the control unit (100) and may be located with the connection of the deballasting piping which leads to the outlet (2) from the ballast tank (50).

The UV/$TiO_2$ system (60) includes a coated plate, irradiates UV (ultra violet ray) to the microorganisms sterilized ballast water which is stored in the ballast tank (50). In this case, according to the irradiation of UV in the ship ballast water, hydroxyl groups (hereinafter referred to as "OH radical") are generated on the surface. By the OH radical, microorganisms which are either alive or in the state of regrowth in the ballast water are sterilized.

In this case, the coated plate may be formed in a mesh type or a punched type.

In addition, the oxygen generated during the electrolysis process of the ballast water or the residual oxidants in the ballast water, by reacting with UV and $TiO_2$, produces high concentration of OH radicals, which have efficiency of sterilizing microorganisms.

Accordingly, by the UV/$TiO_2$ System (60), microorganisms will be sterilized effectively in the deballasting water and by using residual oxidants, generate OH radical, which make an effect that chemicals such as neutralizing agent necessary for neutralization treatment can be minimized and the efficiency of sterilizing microorganisms in the ballast water can satisfy USCG much more.

The second sensor unit (31) has a configuration for measuring the total residual oxide (TRO) concentration of neutralized deballasting water measures TRO concentration of ballast water flowing toward the outlet (2) from the ballast tank (50) and transfers the measured concentration values of residual oxidants of deballasting water to the control unit (100).

And, the control unit (100) is located with the connection of the flow rate measurement unit (20), the filter and electrolysis unit (10), the first sensor unit (30), the second sensor unit (31), the automatic neutralization treatment device (40), the UV/$TiO_2$ system (60), and the chlorine dioxide generation unit (70). And, the control unit (100) receives measurements from the flow rate measurement unit (20), the first sensor unit (30) and the second sensor unit (31), generates a control signal according to the measured values, transfers a generated control signal to one of the filter and electrolysis unit (10), the automatic neutralization treatment device (40), and the chlorine dioxide generation unit (70).

Describing in more detail the generation of the control signal of the control unit (100), the control unit (100), depending on the flow rate values that are transmitted from the flow rate measurement unit (20), controls the strength of electrolysis in the filter and electrolysis unit (10). As an example, if the flow rate value of the ballast water that has been transmitted from the flow rate measurement unit (20) is big, the control unit (100) generates a control signal for controlling so as to increase the electrolysis intensity of the filter and electrolysis unit (10), whereas, if the flow rate value of the ballast water that has been transmitted from the flow rate measurement unit (20) is small, the control unit (100) generates the control signal to lower the electrolysis intensity of the filter and electrolysis unit (10).

And, the control unit (100), depending on the value of the characteristic measurements of the ballast water transmitted from the first sensor unit (30), controls the electrolysis intensity of the filter and electrolysis unit (10). As an example, if the conductivity of the ballast water that is measured by the first sensor unit (30) has a higher value than the reference value, the control unit (100) lowers the electrolysis intensity of the filter and electrolysis unit (10) to generate a control signal for controlling so as to decrease the current application value, whereas, if the conductivity of the ballast water measured by the first sensor unit (30) has a lower value than the reference value, the control unit (100), in order to enhance the electrolysis intensity of the filter and electrolysis unit (10), generates a control signal for controlling so as to increase the current application value.

In addition, when the temperature of the ballast water that is measured by the first sensor unit (30) is above about 10° C., the control unit (100) generates a control signal to increase chlorine dioxide generation amount of the chlorine dioxide generation unit (70), whereas, when the temperature of the ballast water that is measured by the first sensor unit (30) is less than about 10° C., the control unit (100) generates a control signal to lower the chlorine dioxide generation amount of the chlorine dioxide generation unit (70).

And, the control unit (100) controls chlorine dioxide generation amount of the chlorine dioxide generation unit (70) according to the residual oxidant concentration (TRO concentration) in the ballast water that has been transmitted from the first sensor unit (30). As an example, if the value measured in the first sensor (30) is higher (2~3 ppm or more) than the residual oxidant concentration value of a reference value of the ballast water, the control unit (100) generates a control signal for controlling the chlorine dioxide generation unit (70) to generate a large amount of chlorine dioxide, whereas, if the value measured in the first sensor (30) is lower (less than 2~3 ppm) than the residual oxidant concentration value of the reference value of the ballast water, the control unit (100) generates a control signal for controlling the chlorine dioxide generation unit (70) to generate a small amount of chlorine dioxide.

In addition, the control unit (100) controls the amount of UV irradiation of the UV/TiO$_2$ system (60) according to the value of the deballasting water residual TRO (residual oxidant) that has been transmitted from the second sensor unit (31). As an example, if the residual oxidant concentration in deballasting water that is measured by the second sensor unit (31) has a high value, the controller (100) generates a control signal for controlling the UV/TiO$_2$ system (60) to irradiate much more ultraviolet rays to the ballast water, whereas, if the residual oxidant concentration in deballasting water that is measured by the second sensor unit (31) has a lower value, the controller (100) generates a control signal for controlling the UV/TiO$_2$ system (60) to reduce ultraviolet rays in ballast water.

In addition, the control unit (100) controls the amount of the input amount of neutralizing agent of the automatic neutralization device (40) according to the value of the deballasting water residual TRO (residual oxidant) that has been transmitted from the second sensor unit (31). As an example, if the residual oxidant concentration in deballasting water that is measured by the second sensor unit (31) has a high value, the controller (100) generates a control signal for controlling the automatic neutralization device (40) to increase input amount of a neutralizing agent to the ballast water, whereas, if the residual oxidant concentration in deballasting water that is measured by the second sensor unit (31) has a lower value, the controller (100) generates a control signal for controlling the automatic neutralization device(40) to reduce the input amount of the neutralizing agent to the ballast water.

Next, with reference to FIG. 4, the operation of the ballast water treatment system of the present invention will be described.

Figure 4:
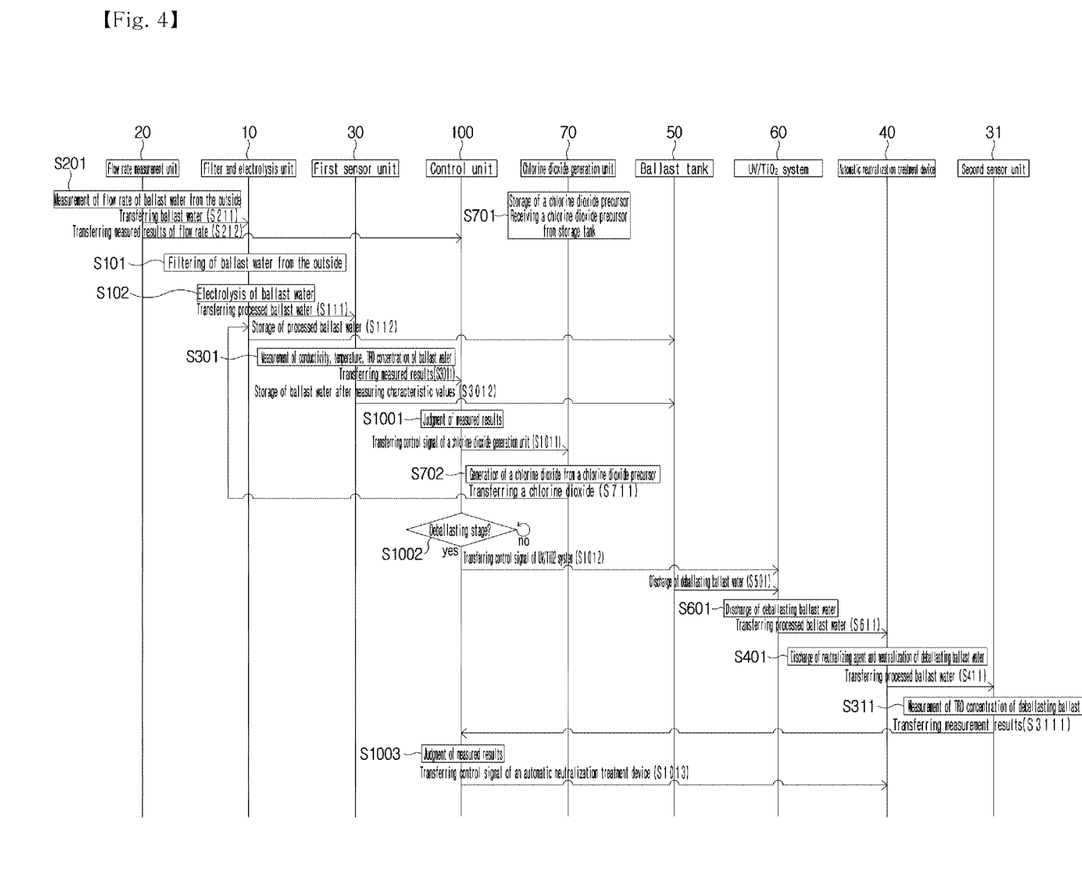
FIG. 4 is a flowchart for the operation of a ballast water treatment system according to an embodiment of the present invention.

As shown in FIG. 4, firstly, the flow rate measurement unit (20) measures the flow rate of the ballast water that has been introduced from the outside to the ballast water treatment system (S201). If the measurement unit (20) bypasses only a part of the ballast water that has been introduced from the outside and measures a flow rate of the part of the ballast water, the flow rate measurement unit (20) transfers the measured flow rate to the filter and electrolysis unit (10) (S212). If the flow rate measurement unit (20) receives the whole of the ballast water that has been introduced from the outside, when measuring the flow rate, the flow rate measuring unit (20) transfers the introduced ballast water which is flowed into the flow rate measuring unit (20) to the filter and electrolysis unit (10) (S211), and transmits the measured flow rate values to the filter and electrolysis unit (10) at the same time (S212).

The filter and electrolysis unit (10) receives ballast water from the outside (or a flow rate measuring unit (20)), filters the received ballast water (S101). In this case, by using filter elements (130) equipped in the filter and electrolysis unit (10), the solid foreign materials and the microorganisms in the ballast water are filtered and the dusts accumulated in the filter elements (130) are washed out through the backwash pipe (160).

Then, the filter and electrolysis unit (10) uses the plural electrode modules (121) to electrolyze the ballast water that has been primarily filtered by the filter elements (130) (S102) and transfers electrolyzed and treated ballast water to the first sensor unit (30) along the pipe (S111).

In this case, the filtered and electrolyzed treated ballast water in the filter and electrolysis unit (10) is transferred to the ballast tank (50) along the ballast piping and stored in the ballast tank (50) (S112).

The first sensor unit (30) measures the conductivity, the temperature, and the concentration of TRO (residual oxidant) of the ballast water discharged from the filter and the electrolysis unit (10) (S301), and transfers the measurement values of sea water characteristics to the control unit (100) (S3011).

In this case, the ballast water of which ballast water characteristics have been measured by the first sensor unit (30) is transferred to the ballast tank (50) and is stored in the ballast bank (50) (S3012).

Next, the control unit (100), according to the characteristic measurement values of the ballast water that have been transmitted from the first sensor unit (30), determines the level of contamination of the ballast water (S1001).

In this case, according to the characteristic measurement values of the ballast water, the control unit (100) transfers a control signal to control the chlorine dioxide generation amount to the chlorine dioxide generation unit (70) (S1011).

The chlorine dioxide generation unit (70) which receives the control signal from the control unit (100) receives the chlorine dioxide precursor from the chlorine dioxide precursor storage tank (71), and stores the chlorine dioxide precursor (S601). Depending on the chlorine dioxide generation control signal transmitted from the control unit (100), the chlorine dioxide generation unit (70) generates chlorine dioxide from the chlorine dioxide precursor (S602).

In this case, the chlorine dioxide generated from the chlorine dioxide generation unit (70) is introduced to the treated ballast water in the filter and electrolysis unit (10) (S611).

And, the control unit (100) determines whether the ballast water treatment process is a deballasting step or not (S1002). In this case, when the ballast water treatment process is not a deballasting step, the control unit (100) does not perform any separate step. On the other hand, when the ballast water treatment process is determined as a deballasting step, the control unit (100) transfers a control signal to the automatic neutralization treatment device (40) so as to eject a neutralizing agent by the automatic neutralization treatment device (40) (S1012).

In this case, when the ballast water treatment system is in a deballasting step, the ballast tank (50) transfers deballasting water to the automatic neutralization treatment device (40) (S501).

Thus, the automatic neutralization treatment device (40) neutralizes the deballasting water discharged from the ballast tank (50) by discharging a neutralizing agent to the deballasting water. In this case, the neutralizing agent discharged from the automatic neutralizing device (40) (S401) is not directly charged into the ballast tank (50), but it is preferable to put the neutralizing agent into a de-ballasting piping located extending from the ballast tank (50) to the ballast water outlet (2).

And, the UV/TiO$_2$ system (60) irradiates ultraviolet rays to deballasting water transferred (S501) from the ballast tank (50) to produce OH radicals, and to sterilize residual microorganisms (S601).

Deballasting water where microorganisms have been sterilized in the UV/TiO$_2$ system (60) is transmitted to the automatic neutralization treatment device (40) (S611).

After then, the second sensor unit (31) measures the TRO concentration of deballasting water neutralized in the automatic neutralization treatment device (40) (S311), and transfers the measured TRO concentration values to the control unit (100) (S3111).

The control unit (100) receiving the TRO concentration values measured in the second sensor unit (31) determines the measurement results (S1003), and generates a control signal for controlling the amount of the neutralizing agent to be discharged from the automatic neutralization device (40) and a control signal for the control of the ultraviolet irradiation intensity of the UV/TiO$_2$ system (60) (S1013).

In accordance with this process, the ballast water can get an efficient ballasting and deballasting treatment, and sterilization standards of the treated ballast water are to satisfy the USCG standards.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A ballast water treatment system comprising:
    a filter and electrolysis unit for receiving ballast water from outside of the ballast water treatment system and filtering and electrolyzing the ballast water;
    a first sensor for measuring seawater characteristics of the ballast water passing through the filter and electrolysis unit and outputting values of the measured seawater characteristics;
    a controller for receiving the values of the measured seawater characteristics from the first sensor and determining a contamination level of the ballast water according to the values of the measured seawater characteristics so as to generate control signals for determining a strength of electrolysis and an input amount of chlorine dioxide, wherein the controller is located to be connected with the first sensor;
    a chlorine dioxide generator for generating the chlorine dioxide, receiving the control signals from the controller and discharging or not discharging the chlorine dioxide according to the control signals;
    a UV and TiO$_2$ system which includes a TiO$_2$-coated plate, and generates an OH radical through an interaction between ultraviolet rays and TiO$_2$ so as to enable the OH radical to sterilize residual microorganisms included in the ballast water passing through the filter and electrolysis unit;
    an automatic neutralization treatment device which includes a neutralizing agent, receives a neutralizing agent discharge signal from the controller and neutralizes the ballast water passing through the filter and electrolysis unit; and
    a second sensor for measuring a total residual oxidant (TRO) concentration of the ballast water neutralized in the automatic neutralization treatment device and transferring a measurement result of the TRO concentration to the controller,
    wherein the controller generates a control signal for controlling an amount of the neutralizing agent discharged from the automatic neutralization treatment device according to the measurement result received from the second sensor, and
    wherein the filter and electrolysis unit includes an electrode module housing, a plurality of electrode modules accumulated along a length direction in the electrode module housing, a plurality of filter elements accumulated along the length direction and outside of the electrode module housing and an electrode gap spacer for inducing rotation of the ballast water.

2. The ballast water treatment system according to claim 1, wherein each of the plurality of filter elements included in the filter of the filter and electrolysis unit is a disk filter.

3. The ballast water treatment system according to claim 1, wherein the plurality of electrode modules included in the filter and electrolysis unit comprise a plurality of accumulated circular disk-typed plural electrodes.

4. The ballast water treatment system according to claim 1, wherein the seawater characteristics measured in the first sensor include one or more of conductivity, temperature, or the TRO concentration of the ballast water.

5. The ballast water treatment system according to claim 1, further comprising a chlorine dioxide precursor storage tank which stores a chlorine dioxide precursor.

6. The ballast water treatment system according to claim 5, wherein the chlorine dioxide precursor is one or more of NaClO$_2$, HCl, and NaOCl.

7. The ballast water treatment system according to claim 1, wherein the TiO$_2$-coated plate is in a form of a meshed or punched plate.

* * * * *